(12) United States Patent
Rashid, A.B.M. et al.

(10) Patent No.: US 9,688,425 B2
(45) Date of Patent: Jun. 27, 2017

(54) PREFORM AND CONTAINER COMPRISING REINFORCING ELEMENTS

(75) Inventors: Bazlur Rashid, A.B.M., Dublin, OH (US); Patrick Ryan Walker, Pataskala, OH (US); Robert Lepior, Powell, OH (US); Eric Didier, Remoncourt (FR); Eric Lupke, Vittel (FR); David Hutts, Fort Worth, TX (US)

(73) Assignee: Nestec S.A., Vevey (CH)

( * ) Notice: Subject to any disclaimer, the term of this patent is extended or adjusted under 35 U.S.C. 154(b) by 869 days.

(21) Appl. No.: 13/508,457

(22) PCT Filed: Nov. 5, 2010

(86) PCT No.: PCT/US2010/055545
§ 371 (c)(1),
(2), (4) Date: Aug. 8, 2012

(87) PCT Pub. No.: WO2011/057036
PCT Pub. Date: May 12, 2011

(65) Prior Publication Data
US 2013/0134124 A1    May 30, 2013

(30) Foreign Application Priority Data
Nov. 6, 2009    (WO) .................... PCT/US09/63536

(51) Int. Cl.
| | | |
|---|---|---|
| *B29B 11/16* | (2006.01) | |
| *B65B 1/44* | (2006.01) | |
| *B65D 1/02* | (2006.01) | |
| *B65D 35/08* | (2006.01) | |
| *B29B 11/14* | (2006.01) | |
| *B29C 49/00* | (2006.01) | |
| *B65D 1/44* | (2006.01) | |
| *B29B 11/08* | (2006.01) | |
| *B29C 49/06* | (2006.01) | |
| *B29C 49/64* | (2006.01) | |
| *B29K 23/00* | (2006.01) | |
| *B29K 25/00* | (2006.01) | |
| *B29K 27/06* | (2006.01) | |
| *B29K 67/00* | (2006.01) | |
| *B29K 69/00* | (2006.01) | |
| *B29K 105/00* | (2006.01) | |
| *B29L 31/00* | (2006.01) | |

(52) U.S. Cl.
CPC ............... *B65B 1/44* (2013.01); *B29B 11/14* (2013.01); *B29B 11/16* (2013.01); *B29C 49/0078* (2013.01); *B65D 1/02* (2013.01); *B65D 1/0207* (2013.01); *B65D 1/0223* (2013.01); *B65D 1/0261* (2013.01); *B65D 1/44* (2013.01); *B65D 35/08* (2013.01); *B29B 11/08* (2013.01); *B29B 2911/1402* (2013.01); *B29B 2911/1404* (2013.01); *B29B 2911/14026* (2013.01); *B29B 2911/14033* (2013.01); *B29B 2911/1434* (2013.01); *B29B 2911/1444* (2013.01); *B29B 2911/14106* (2013.01); *B29B 2911/14133* (2013.01); *B29B 2911/14326* (2013.01); *B29B 2911/14333* (2013.01); *B29B 2911/14344* (2015.05); *B29B 2911/14345* (2015.05); *B29B 2911/14466* (2013.01); *B29B 2911/14593* (2013.01); *B29C 49/06* (2013.01); *B29C 49/6418* (2013.01); *B29K 2023/06* (2013.01); *B29K 2023/12* (2013.01); *B29K 2025/00* (2013.01); *B29K 2027/06* (2013.01); *B29K 2067/00* (2013.01); *B29K 2067/046* (2013.01); *B29K 2069/00* (2013.01); *B29K 2105/258* (2013.01); *B29L 2031/7158* (2013.01); *B65D 2501/0045* (2013.01); *Y10T 428/1352* (2015.01); *Y10T 428/1379* (2015.01); *Y10T 428/1383* (2015.01); *Y10T 428/1397* (2015.01)

(58) Field of Classification Search
CPC ...... B65D 1/02; B65D 1/0207; B65D 1/0223; B65D 1/0261; B65D 35/08; Y10T 428/1352; Y10T 428/1379; Y10T 428/1383; Y10T 428/1397; B29B 11/16; B29C 49/0078
USPC ................. 428/35.7, 36.6, 36.7, 36.92
See application file for complete search history.

(56) References Cited

U.S. PATENT DOCUMENTS

| | | | |
|---|---|---|---|
| 4,170,622 A | 10/1979 | Uhlig | |
| 4,892,205 A | 1/1990 | Powers et al. | |
| 4,927,679 A * | 5/1990 | Beck | ............. 428/36.92 |
| 5,229,142 A * | 7/1993 | Yokobayashi | ............. 425/522 |
| 5,455,088 A * | 10/1995 | Deemer | ............. 428/35.7 |
| 9,034,446 B2 * | 5/2015 | Witz | ............. B29C 49/0073 428/35.7 |
| 2004/0031802 A1 | 2/2004 | Parodi | |

FOREIGN PATENT DOCUMENTS

| | | |
|---|---|---|
| FR | 2724588 | 3/1996 |
| JP | 55079236 | 6/1980 |

(Continued)

OTHER PUBLICATIONS

International Search Report for PCT Application PCT/US2010/055545 with a mailing date Feb. 25, 2011.

(Continued)

*Primary Examiner* — Walter B Aughenbaugh
(74) *Attorney, Agent, or Firm* — K&L Gates LLP

(57) ABSTRACT

The present invention relates to a plastic preform (200) for a container (300) comprising at least one elongate reinforcing element (210), and obtained by injection-molding. The present invention further relates to a container (300) blow-molded from such a preform (200), and comprising at least one reinforcing element (320), and having a continuous and smooth outer surface (310*b*).

10 Claims, 18 Drawing Sheets

(56) References Cited

FOREIGN PATENT DOCUMENTS

| JP | 07366604 | 12/1992 |
|----|----------|---------|
| JP | 0752233 | 2/1995 |
| JP | 1190975 | 4/1999 |
| JP | 11130035 | 5/1999 |
| WO | WO9004543 | 5/1990 |

OTHER PUBLICATIONS

Written Opinion of the International Searching Authority for PCT/US2010/055545 with a mailing date Feb. 25, 2011.

* cited by examiner

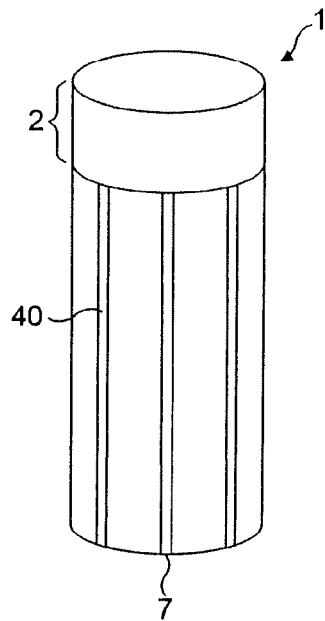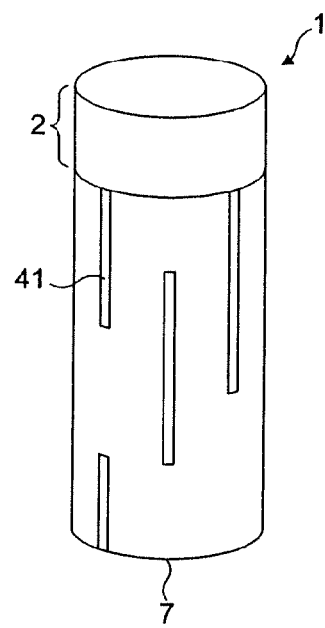
Fig. 23a  Fig. 23b
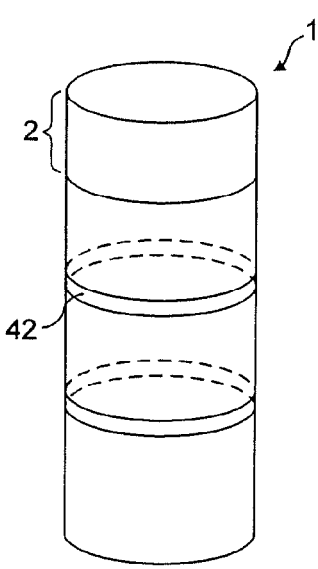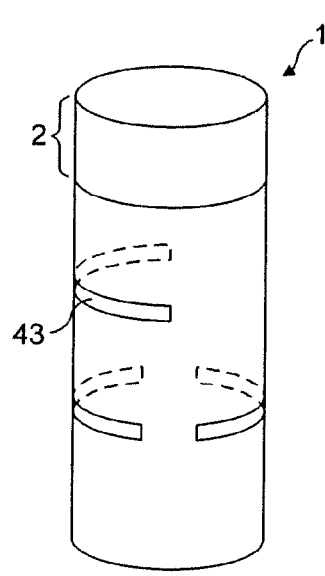
Fig. 23c  Fig. 23d

PREFORM AND CONTAINER COMPRISING REINFORCING ELEMENTS

CROSS REFERENCE TO RELATED APPLICATIONS

The present application is a National Stage of International Application No. PCT/US2010/055545, filed on Nov. 5, 2010, which claims priority to International Application No. PCT/US09/63536, filed on Nov. 6, 2009, the entire contents of which are being incorporated herein by reference.

FIELD OF THE INVENTION

The present invention relates to a preform and a container with reinforcing elements. Specifically, the present invention relates to the field of providing reinforcing elements on the inside of a preform and a container.

BACKGROUND OF THE INVENTION

The process of producing for example bottles for beverages includes injection-molding of a preform and blow-molding of the container is known in prior art. A major task within this field is to decrease the weight of the final container thereby maintaining the same filling volume. These light-weighting containers however come to their limits when the mechanical performance of the empty or filled container is negatively influenced, which makes the handling of the container in the production line and later during storage and transport more difficult or even impossible. The containers can deform or even get broken due to the external load, if the containers are not designed to withstand the external forces.

A further problem with light-weighting containers arises when the container is filled with fluids under pressure, e.g. with carbonated beverages. In this case the container still has to provide enough strength to withstand the internal pressure. Furthermore, the resistance of containers under vacuum is often too low.

Thin and light-weighted containers which are blow-molded from a thin preform further pose problems during the production of the preform itself. During the injection-molding of the preform the material is injected into the mold from the end cap, so that the material flows along the full preform length before forming the neck part. However, this requires a minimum wall thickness of the preform to allow the material to flow through the mold to fill the neck part.

Containers as mentioned above, for example bottles holding drinkable fluids, are usually labeled, at least with information concerning its ingredients. An easy labeling of state of the art containers is often compromised by an uneven outer surface.

It is therefore the object of the present invention to improve the prior art.

Specifically it is an object of the present invention to provide preforms and containers having less weight and thinner walls, but at the same time to provide an improved strength to withstand external load, internal pressure and vacuum, and to provide an outer surface suited for easy label application.

This object is solved by the independent claims. Further features and embodiments are subject matter of the dependent claims.

BRIEF DESCRIPTION OF THE DRAWINGS

Additional features and advantages of the present invention are described in, and will be apparent from, the description of the presently preferred embodiment, which are set out below with reference to the drawings in which:

FIGS. 23A and 23B show different examples of positioning the ribs on the preform;

FIGS. 23C to 23D show different embodiments of positioning reinforcing elements on the preform according to the present invention;

DETAILED DESCRIPTION OF THE INVENTION

Figure 1:
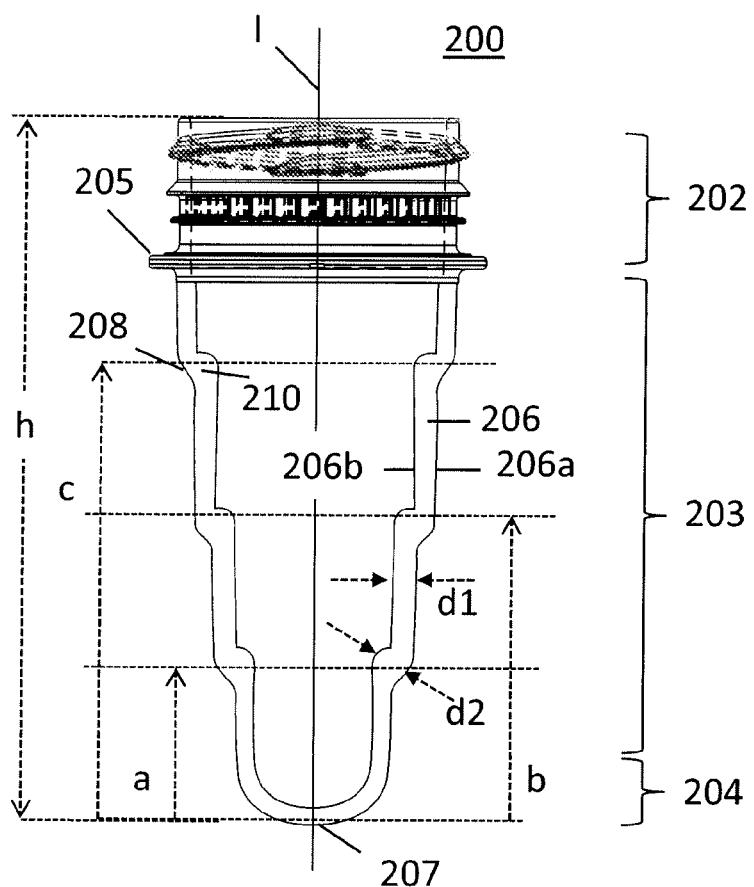
FIG. 1 shows a vertical cross-section of an embodiment of a preform according to the present invention.

The present invention generally relates to a plastic preform for a container comprising at least one elongate reinforcing element. The reinforcing elements have an elongate or longish shape and are extending in linear direction perpendicular to the longitudinal axis of the preform.

More generally speaking, the preform according to the present invention has variable wall thicknesses thereby providing a structure with elongate reinforcing elements.

Preferably the preform according to the present invention has a substantially constant wall thickness and has one or more reinforcing elements extending inside the preform. The reinforcing elements or the reinforcing elements on the inside wall extend in a horizontal direction.

For a preform with reinforcing elements according to the present invention less material has to be used, since the reinforcing elements allow to provide thinner walls compared with standard preforms.

Further, with the preforms according to the present invention the problems with thin walled preforms during the injection-molding can be solved. When using preforms having reinforcing elements according to the present invention, a preform with thinner wall can be produced industrially as the material during the injection-molding can easily flow through the reinforcing elements to fill the neck part. As a consequence, the amount of material to produce a good looking slim container from the preform with sufficient mechanical properties is significantly decreased.

According to the present invention from the inventive preforms containers can be produced being light-weighted and having thinner walls, but at the same time having an improved strength with respect to top-load and/or internal pressure. Furthermore the resistance under vacuum is improved by providing at least one elongate reinforcing element on the inner side of the side wall of the preform extending in a direction perpendicular to the preforms longitudinal axis, which likewise transforms into at least one elongate reinforcing element on the inner side of the side wall of the container resulting from blow-molding the preform. As a further beneficial effect, due to the fact that the elongate reinforcing elements will be located on the inner side of the side wall of the container, a smooth outer surface of the container can be achieved, since no reinforcing elements have to be provided on the outer surface. Thus, label application is simplified.

The container thereby has several improvements compared to prior art containers. Usually, when using a standard preform without reinforcing elements during the blow-molding, ribs are added in the blow-mold to provide a container with improved strength. Such added ribs however result in an interrupted exterior surface of the container, which is not desirable from an aesthetic point of view.

This problem is also overcome by the present invention. Since the bottle is blow-molded from a preform having already reinforcing elements provided on the inside, the resulting shape of the bottle will be substantially continuous and smooth on the outside. In order to completely avoid any external ribs, with the present invention only reinforcing elements on the inside can be provided. This is not possible with the prior art addition of ribs which can only be added to the outside of the container.

The container according to the present invention is preferably a bottle, into which different kinds of fluids can be filled. Examples of such fluids are beverages, e.g. water, juices or carbonated beverages.

In the following, the present invention will be explained in more detail with reference to the enclosed drawings.

FIG. 1 shows a vertical cross-section of a preform 200 according to a preferred embodiment of the present invention. Generally, the preform 200 comprises a neck portion 202, an intermediate portion 203 and a body portion 204. Depending on the type of closure used for the final container 300, the neck portion 202 can comprise one or more protruding parts 205, which allow to attach the cap of the final container 300. The neck portion 202 remains unchanged during the blow-molding process. The intermediate portion 203 and the body portion 204 will be stretched to the final container 300 during the blow-molding process.

The preform 200 comprises a side wall 206 extending from the neck portion 202 to the body portion 204, and a tip 207 at the lowermost point of the body portion 204. A longitudinal axis 1 of the preform 200 is illustrated in FIG. 1, and when in the following the term "vertical" or "longitudinal" is used, it is intended to describe a direction extending in a direction parallel to the axis 1. In other words, this describes a direction from the bottom portion 204 to the neck portion 202. Likewise, the term "horizontal" or "circumferential" is used to describe a direction being orthogonal to the vertical direction, thus extending along a circumferential direction of the side wall 206 or parallel to the neck portion 202 of the preform 200.

The preform 200 according to the present invention comprises at least one reinforcing element 210. In FIG. 1 three reinforcing elements 210 are exemplarily illustrated. Each of the reinforcing elements 210 extends in a horizontal direction perpendicular to the longitudinal axis 1 of the preform 200. Each reinforcing element 210 preferably extends completely in a circumferential direction on the inner side 206b of the side wall 206 of the preform 200, but can also extend only partially along the circumferential direction. Each reinforcing element 210 is located in the intermediate portion 203 of the preform 200, not in the body portion 204.

A reinforcing element 210 is formed preferably at a step 208 of the side wall 206 of the preform 200, wherein at each step 208, the total diameter of the preform 200 decreases. Thereby, the diameter of the outside 206b of the side wall 206 decreases gradually, i.e. slanted in an angle between 1° and 89°, preferably 25° to 55°, in respect to the to the longitudinal axis 1. The diameter of the inner side 206b of the side wall 106, however, decreases abruptly at the step 208, that means it bends sharply, forming a nearly 90° angle. The difference of the course of the outer diameter and the inner diameter at a step 208 occurs, because the reinforcing element 210 is formed by accumulating material on the inside 206b of the side wall 206, preferably at the location of a step 208. As can be seen in FIG. 1, the accumulation of material at a step 208 is reflected by the fact that the thickness d2 of the reinforcing element 210 is increased compared to the thickness d1 of the side wall 206 away from the reinforcing element 210. As an aside, reinforcing elements 210 could also be provided apart from a step 208, or a preform 200 without step 208, and only with at least one reinforcing element 210 could be fabricated.

Figure 2:
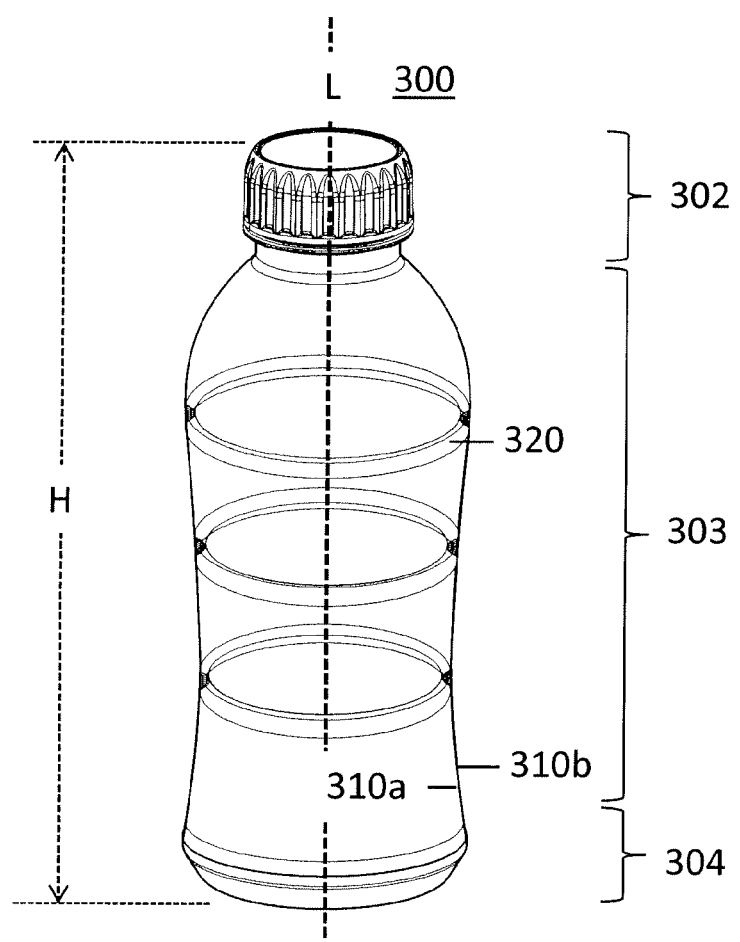
FIG. 2 shows a container according to the present invention.

The thickness d2 of the reinforcing element 210 is increased compared to the thickness d1 of the side wall 206 by an amount within a range of about 7% to 50%. A more preferred range is 15% to 35%, a most preferred range 22% to 30%. Due to the increased thickness d2 of the reinforcing element 210, i.e. the accumulated material, preferably at a step 208, the reinforcing element 210 will transform to a reinforcing element 320 of a plastic container 300, preferably a bottle, which is formed from the preform 200, in the blow-molding process. FIG. 2 shows such a container 300, with reinforcing elements 320 (three reinforcing elements 320 are illustrated as example), wherein each reinforcing element 210 of the preform 200 is directly reflected by one reinforcing element 320 of the container 300.

The reinforcing elements 320 of the container 300 are elongated and provided on the inner side 310a of the side wall 310 of the container 300, and are extending in a direction perpendicular to the longitudinal axis L of the container 300. No reinforcing elements are present at the outside 310b of the container 300, leaving the outer surface 310b continuous, flat and smooth, while the inside surface 310a will look like material has been left intentionally to form the reinforcing elements 320. The reinforcing elements 320 reinforce the structure of the container 300 against pressure and for a better vacuum resistance.

Since the outer surface 310b of the container 300 is maintained smooth and flat, labeling can be provided on the container 300 without wrinkles and witness lines. Thus, labeling of the container 300 becomes easier, and possibilities for new designs of the labels arise.

Referring again to FIG. 1, the preform 200 can comprise more than one reinforcing element 210, for example two reinforcing elements 210, or three reinforcing elements 210 as shown in FIG. 1. If more than one reinforcing element 210 is provided, a bottom reinforcing element 210, i.e. the lowermost reinforcing element of the plurality of reinforcing elements 210, is located at a first distance a from the tip 207 of the preform 200. A top reinforcing element 210, i.e. the uppermost reinforcing element of the plurality of reinforcing elements 210, is located at a second distance c from the tip 207 of the preform 200. The location of the reinforcing elements 210 in the preform 200 will be adjusted according to a total height h of the preform 200. The total height h of the preform 200 is chosen in relation to the size, shape and design of the final container 300. The ratio of the height h of the preform 200 and the first distance a is set preferably to a range of 4.48 to 13.46, and the ratio of the height h of the preform 100 and the second distance c is preferably set to a range of 1.34 to 1.39.

For example, for a preform 200 with a total height h of 8.55 cm, the bottom reinforcing element 210 will be located at a first distance a from the tip 207 being in a range of 0.63 cm to 1.91 cm. The top reinforcing element 210 will be located at the second distance c from the tip 207 being in a range of about 4.44 cm to 6.35 cm. Thus, the range from 0.63 cm to 6.35 cm in this preform example 200 defines the maximum possible range, over which the plurality reinforcing elements can be equally distributed. The reinforcing elements 210 are only provided in the intermediate portion 103, and serve to increase the vacuum resistance of the final container 300 and to improve label application, not in the body portion 204. Reinforcing elements in the body portion 204 would result in an increased bottom stability of the final container 300.

In a case, where the preform 200 comprises more than two reinforcing elements 210, e.g. three reinforcing elements 210, the reinforcing elements 210 are disposed equidistant to each other. However, this is only a preferred arrangement, and also varying distances between reinforcing elements 210 are possible, depending for example on the diameter of the container 300. As shown in FIG. 2, the diameter of the container 300 can vary in its intermediate portion. The reinforcing elements could for example be located closer to each user at portions of the container 300 with a larger diameter, in order to provide extra stability, and further apart from each other at portions of the container 300 with a smaller diameter, in order to save material, since a container 300 with a smaller diameter is anyhow more stable. The arrangement could of course also be vice versa. However, with equidistant spacing between the reinforcing elements 210, a preferred range, in which a middle (e.g. the third) reinforcing element 210 is located, is again be defined by the ratio of the height h of the preform 200 and a third distance b, which is preferably set to a range of 2.24 to 3.37. For the exemplary preform 200 with a height of 8.55 cm this would correspond to a location of the middle reinforcing element 210 being in a range of 3.36 cm to 5.05 cm.

According to the final height H of the container 300, and according to requirements of vacuum resistance, the number of reinforcing elements 210 can be increased or decreased. The more reinforcing elements 210 are provided, the higher the vacuum resistance of the final container 300. The fewer reinforcing elements 210 are provided, the less material has to be used, and the cheaper the final container 300 can be produced.

According to the height H, the shape and design of the final container 300, the total height h of the preform 100 will be accordingly adjusted. Also the location of the reinforcing elements 210 and the number of reinforcing elements 210 will be adjusted.

FIG. 2 shows the final container 300, as an example with three reinforcing elements 320. The reinforcing elements 320 are provided in an intermediate part 303 of the container 300, and improve its vacuum resistance and resistance to pressure. The reinforcing elements 320 are not provided in the bottom part 304 of the container 300 or the neck part 302 of the container 300. A container 300, which is blow-molded from a preform 200 mentioned in the example above, which has a height h of 8.545 cm, would have a height H of 18.56 cm. The smaller the container 300, the fewer reinforcing elements 320 are needed to achieve the desired stability.

Figure 3:
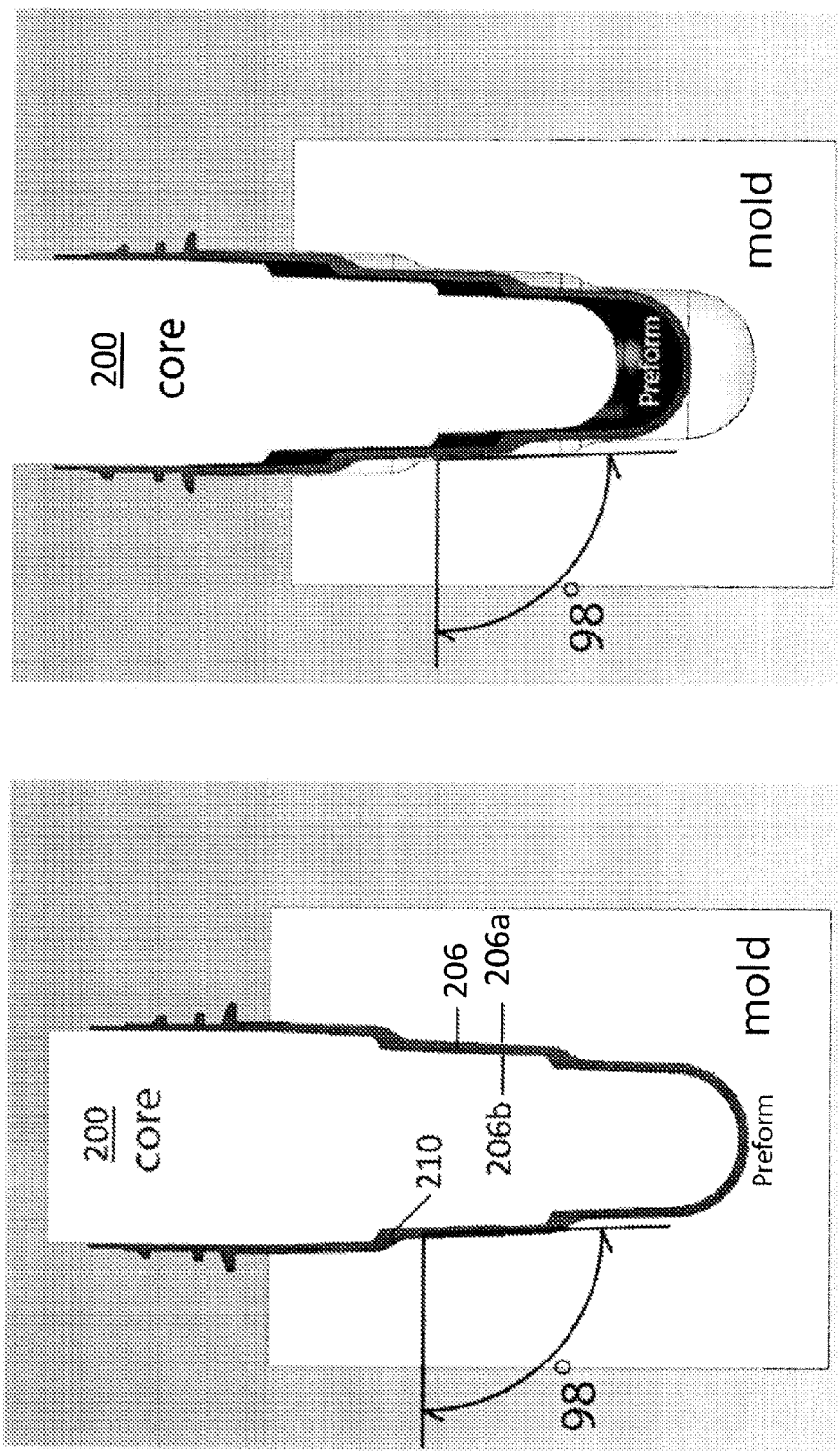
FIG. 3 shows a vertical cross-section of a mold and a preform according to the present invention during the molding process.

FIG. 3 shows another drawing of the preform 200 with the reinforcing elements 210 provided at the steps 208 of the side wall 206. In FIG. 2 two reinforcing elements 210, and also two steps 208, are shown. The diameter of the preform 200 decreases from the neck portion 202 to the tip 207. Aside from the decrease of the diameter at the steps 208, which was mentioned above, the diameter of the preform 200 also decreases inbetween the steps. To this end, the side wall 206 of the preform 200 is preferably slightly slanted, i.e. the angle of the side wall and an axis perpendicular to the longitudinal axis 1 of the preform 200 form an angle of about 95° to 100°, preferably 98°. For the example preform 200 introduced above (height h of 8.545 cm), the diameter preferably decreases from 3.36 cm to 0.63 cm.

The right part of FIG. 3 shows the preform 200 during a process of pulling it out of the mold, in which it is formed for example by injection-molding. Due to the fact that the diameter of the preform 200 decreases from the neck portion 202 to the tip 207, it can be prevented that the preform 200 gets caught, when being pulled out of the mold. Thus, the process of pulling out the preform 200 of the mold is simplified, and damage to the preform 200 can be largely prevented. FIG. 2 also nicely shows how additional material is accumulated at the steps, in order to form the reinforcing elements 210, which transform into the reinforcing elements 320 of the final container 300, after subjecting the preform 200 to a blow-molding process.

In the following, further examples demonstrate, how preforms and containers can be alternatively designed. Occasionally, features relating to the examples can be beneficially adopted within the above embodiment of the present invention, where appropriate.

Figure 4A:
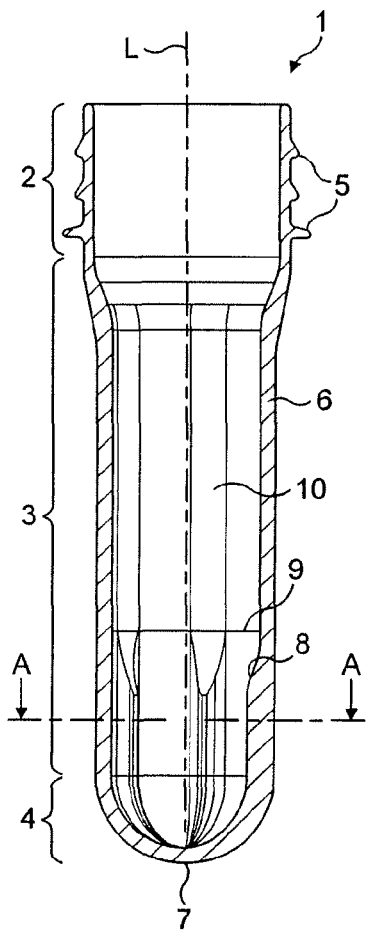
FIG. 4A shows a vertical cross-section and FIG. 4B shows a horizontal cross-section of a first example of a preform.

FIG. 4A shows a vertical cross-section of a first example of a preform 1. Generally, the preform 1 comprises a neck portion 2 or thread portion, an intermediate portion 3 and a body portion 4. Depending on the type of closure used for the final container, the neck portion 2 can comprise one or more protruding parts 5 which allow to attach the cap to the final container. The neck portion 2 during the blow-molding process remains unchanged.

The intermediate portion 3 and the body portion 4 during the blow-molding will be stretched to the shape of the final container.

As shown in FIG. 4A the preform 1 comprises side wall 6 extending from the neck portion 2 to the body portion 4 and forming the bottom 7 of the preform 1.

The term "vertical" or "longitudinal" is again used, if it is intended to describe a direction extending in a direction parallel to the longitudinal axis L of the preform 1. In other words, this describes a direction from the bottom portion 4 to the neck portion 2.

Likewise, in case that the term "horizontal" or "circumferential" is used, it is intended to describe a direction being orthogonal to the vertical direction, thus extending along a circumferential direction of the side wall 6 or parallel to the neck portion 2 of the preform 1.

The preform 1 according to the first example comprises several ribs 10 extending in a vertical direction from a middle part 9 of the intermediate portion 3 to the bottom 7. The ribs 10 do not begin right below the neck portion 2, but their end is spaced apart from the neck portion 2 and begins within the intermediate portion 3. They are extending along at least a part of the length of the side wall 6 and join each other at the central point of the bottom 7.

As shown in the cross-section in FIG. 4A, the preform in this example can have a step 8, i.e. an increase in thickness of the side wall 6 along the vertical direction, so that the side wall 6 near the neck portion 2 is thinner than the side wall 6 near the body portion 4.

However, preforms without steps having a substantially constant thickness of the side wall 6 can be designed. Further, it is to be noted that even though in the following description the term "ribs" is used, "reinforcing element" as above for the embodiment of the present invention is encompassed, like any other type of elongate protrusion. The elongate protrusions serve as reinforcing elements.

Figure 4B:
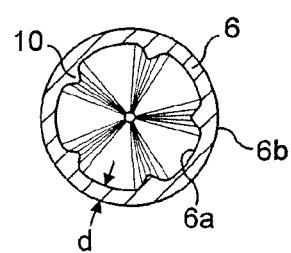

FIG. 4B shows a cross-section of the preform 1 as shown in FIG. 4A along the line indicated by arrows A. As can be seen the preform 1 along a horizontal circumferential line comprises a substantially constant thickness d of the side wall 6 and only at several points comprises inner ribs 10 protruding from the inside surface 6a of the side wall 6. On the outer surface 6b in the present example there are provided no ribs.

In the example as shown in FIGS. 4A and 4B the ribs have a substantially triangular cross-section.

The triangular inner ribs 10 thus provide a selective thickening of the side wall 6 of the preform 1. With these reinforcing elements the thickness of the sidewall 6 at the portions with no ribs can be made thinner than compared to standard preforms. More concretely, standard preforms usually have a wall thickness of at least 2.2 mm. With the present example a lower wall thickness becomes possible, since on one hand the strength of the preform 1 and the final container is ensured by the reinforcing elements and on the other hand the injection molding of a thin-walled preform, as previously explained, becomes only possible if the material can flow through the mold along the ribs.

Figure 5A:
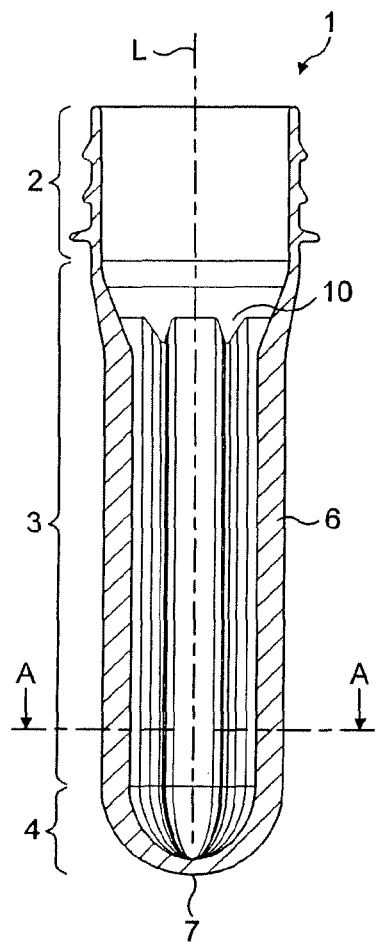
FIG. 5a shows a vertical cross-section and FIG. 5B shows a horizontal cross-section of a second example of a preform.

A second example will be explained with reference to FIGS. 5A and 5B. Again FIG. 5A shows a vertical cross-section of the preform 1 and FIG. 5B shows a horizontal cross-section of the preform 1 as shown in FIG. 5A along the line indicated by arrows A.

The different parts of the preform are identical to the preform according to the first example as shown in FIG. 4. However, is the length of the ribs is increased with respect to the preform as shown in FIG. 4, so that the ribs extend along the complete sidewall from the neck portion 2 to the bottom 7 As can be seen in FIG. 5B the wall 6 again comprises a substantially constant thickness d and a plurality of ribs 10 are protruding from the inside surface 6a of the side wall 6. The outer surface 6b of the side wall has no ribs.

Figure 5B:
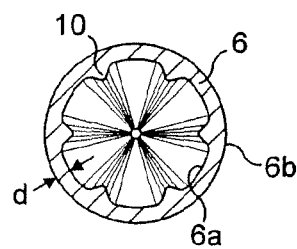

The ribs as shown in FIGS. 4B and 5B have an equal distance between each other but it is also possible to provide ribs having different distances to each other. The number of ribs can be one, two or even more for example up to several hundred ribs depending on the type of final container.

Figure 6A:
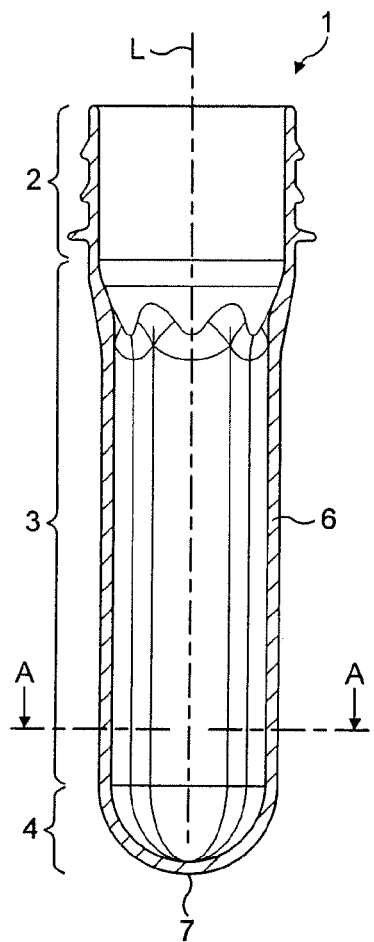
FIG. 6A shows a vertical cross-section and FIG. 6B shows a horizontal cross-section of a third example of a preform.
Figure 6B:
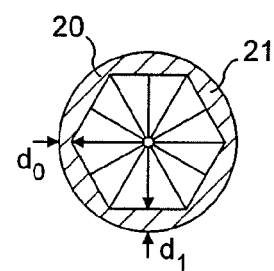

FIGS. 6A and 6B again show a vertical cross-section and a horizontal cross-section through a third example of a preform 1.

In this preform there is not provided a substantially constant thickness of the side wall 6, but a rather constantly varying thickness of the side wall 6 is provided. Hereby, the thickness of the side wall 6 along the vertical direction is always constant but varying along the horizontal direction of the side wall. As can be seen from FIG. 6B there are provided grooves or recesses 20 having a minimum wall thickness d0 of the side wall 6. Between every two grooves 2 there is provided a maximum thickness portion 21 having the maximum thickness d1. The wall thickness of the side wall 6 is hereby constantly increasing or decreasing between the grooves 20 and the maximum thickness portions 21.

In this way the preform comprises vertical reinforcing elements or in other words comprises elongate parts of different wall thicknesses extending along a vertical direction.

Figure 7A:
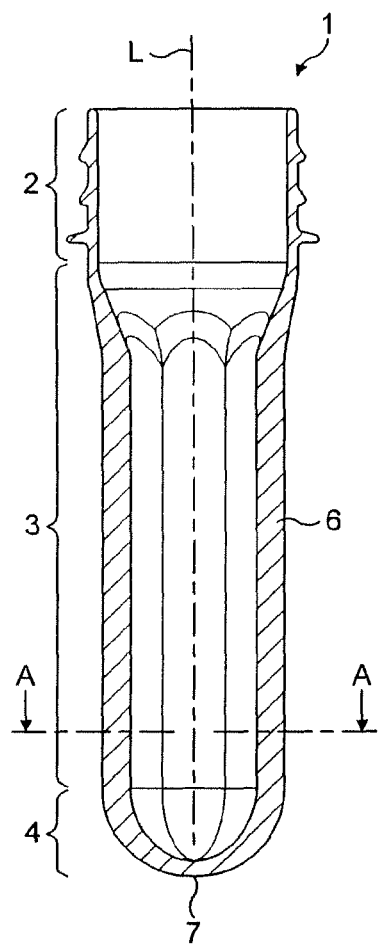
FIG. 7A shows a vertical cross-section and FIG. 7B shows a horizontal cross-section of a fourth example of a preform.
Figure 7B:
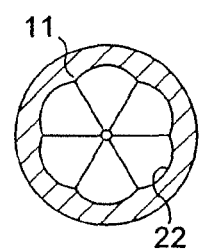

FIGS. 7A and 7B show a fourth example of a preform. Like in the example shown in FIGS. 6A and 6B in this fourth example the thickness of the side wall 6 along a horizontal direction is varying. Hereby, again, grooves or recesses 22 are provided having a minimum wall thickness and protrusions or ribs 11 are provided having maximum wall thickness.

Between every two recesses 22 a protrusion 11 is provided. The wall thickness of the sidewall 6 in contrast to the third example is not constantly decreasing and increasing, but increases with a higher rate next to the protrusions or in other words increases with a lower rate next to the recesses 22. Thereby the recesses have a roundish or concave shape.

Figure 8:
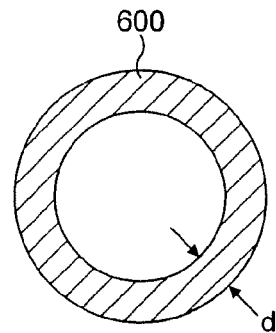
FIG. 8 shows a horizontal cross-section of a preform according to prior art.

FIGS. 8 to 13 now explain several different positions and shapes of vertical ribs according to an exemplary preform 1. Each of FIGS. 8 to 13 shows a cross-section of a preform 1. Hereby, for a better explanation FIG. 8 shows a cross-section of a preform according to prior art.

As can be seen from FIG. 8 the preform according to prior art has a side wall 600 having a constant wall thickness d and no ribs and/or grooves.

Figure 9:
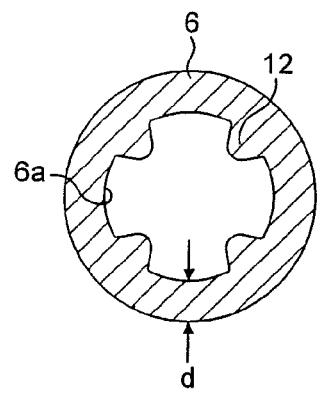
FIGS. 9 to 13 show horizontal cross-sections of different preforms.

FIG. 9 shows a cross-section of a preform having a substantially constant thickness d of the side wall 6 along a horizontal direction and having ribs 12 on the inside surface of the side wall 6. In the example shown in FIG. 9 there are provided four inside ribs with constant distance to each other and having a cross-section of a triangle with rounded top corner.

Figure 10:
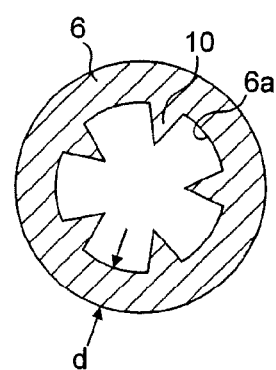

FIG. 10 shows an example where again the preform has a substantially constant wall thickness d of the side wall 6 and where five ribs 10 are provided on the inside surface 6a of the preform. The ribs 10 in this example have a substantially triangular cross-section.

Figure 11:
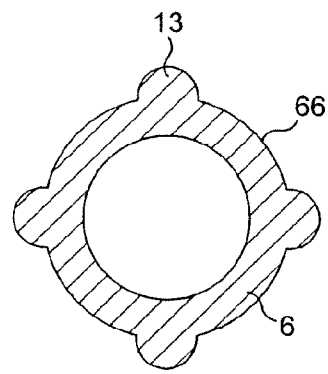
Figure 12:
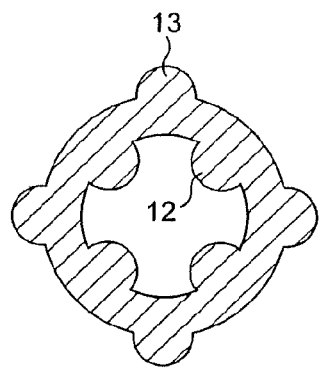
Figure 13:
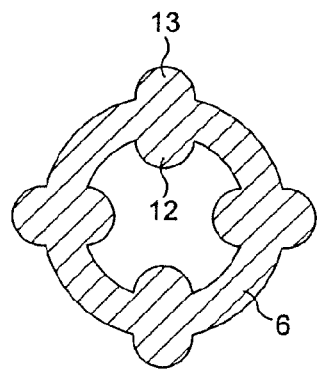

In the example shown in FIGS. 11 to 13 cross-sections of preforms are shown having ribs 12, 13 with a cross-section of a half-circle. However, FIGS. 11 to 13 are intended to show different possible positions of the ribs and the examples are not restricted to the specific cross-section of the shown ribs.

In FIG. 11 the ribs 16 are provided only on the outside surface 6b of the side wall 6.

In FIG. 12 inside ribs 12 as well outside ribs 13 are provided. In the embodiment shown in FIG. 12 an equal number of inside ribs 12 and outside ribs 13 is provided. Hereby, the inside ribs 12 and outside ribs 13 are offset to each other, so that on a position along the side wall 6 where there is provided an outside rib 13 no corresponding inside rib 12 is provided.

A further example is shown in FIG. 13 where, as in FIG. 12, an equal number of inside ribs 12 and outside ribs 13 is provided. However, in this example the ribs are not offset to each other but provided on opposed sides of the side wall 6.

Figure 14:
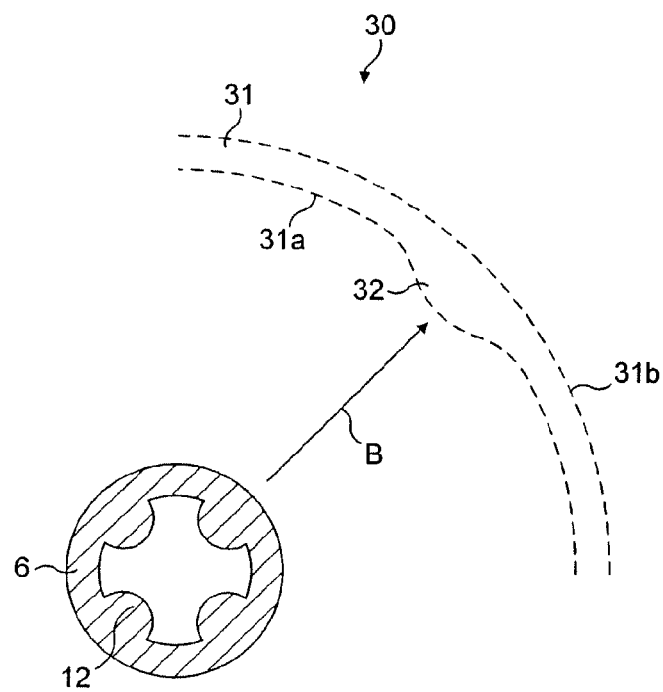
FIG. 14 shows a horizontal cross-section of a further example of a preform and schematically the form of the resulting blow-moulded container.

FIG. 14 shows a cross-section of a preform having four inner ribs 12. Further shown in FIG. 14 is a part 30 of a final container which is blow-molded from the corresponding preform 1 having a configuration as shown in FIG. 14.

The part 30 of the final container is shown with dashed lines. As can be seen, the side wall 6 of the preform will result into a corresponding side wall 31 of the container. The side wall 31 also has an inner side 31a and an outer side 31b. The inner rib 12 of the preform will result in corresponding inner ribs 32 or protrusions or reinforcing elements in the final container. The transition from the inner rib 12 of the preform into the protrusion 32 of the final container is schematically indicated in FIG. 14 with an arrow B. In the embodiment of the present invention explained above, the reinforcing elements 210 of the preform 200 of FIG. 1 will likewise undergo the transition to the reinforcing elements 320 of the container 300 shown in FIG. 2.

By using a preform having therein reinforcing elements, the surface of the final container will have a substantially continuous, i.e. a smooth shape. In other words, the surface of the container has no interruptions deriving from reinforcing or ornamental elements attached to the preform after producing the preform or attached to the container after blow-molding the container. This is schematically shown by the shape of the inner side 31a of the final container from which it can be seen that there is in fact a thickened portion which results from the inner rib 12, but it is smoothly integrated into the side wall 31 of the final container. The same is true for the reinforcing elements 320 of the container 300 produced from the inner reinforcing elements 210 of the preform 200 of the present invention as shown in FIGS. 1 and 2, respectively.

Figure 15:
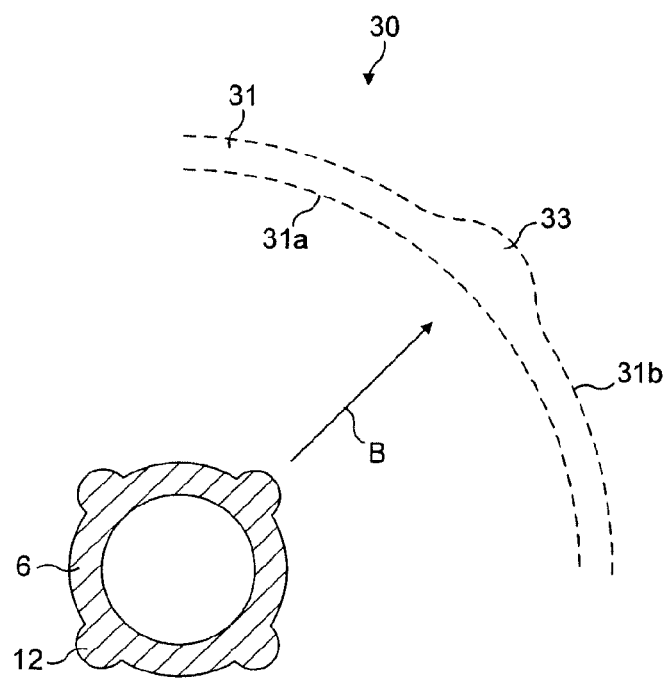
FIG. 15 shows a horizontal cross-section of a further example of a preform and schematically the form of the resulting blow-moulded container.

The same configuration for the case of outer ribs 13 is shown in FIG. 15. Again a cross-section of a preform with four outer ribs 13 is shown. A part 30 of the final container is indicated by dashed lines. As can be seen the side wall 31 comprises an inner wall 31a being flat and an outer wall 31 having a smoothed rib or protrusion 33 resulting from the outer rib 13 of the preform. Thereby, the final container is strengthened.

The examples so far have been explained with reference to preforms having vertical ribs and/or grooves.

Now several types of preforms having horizontal ribs and/or grooves will be explained, which are closer related to the preform 200 of the embodiment of the present invention having horizontal reinforcing elements 210, as shown in FIG. 1.

Figure 16:
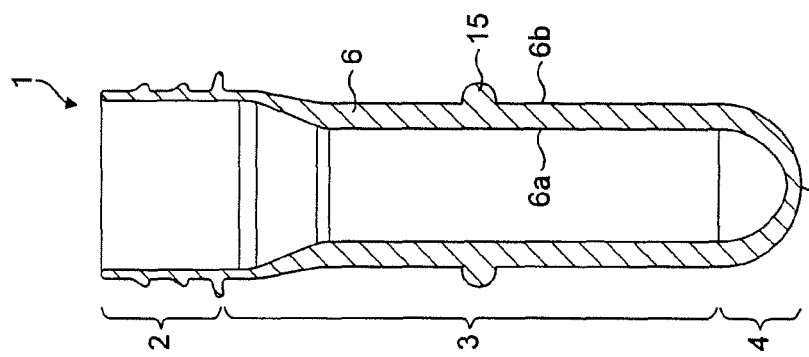
FIG. 16 shows a vertical cross-section of a fifth example of a preform.

A preform according to a fifth example is shown in FIG. 16.

According to this fifth example of the preform 1 there are provided one or more horizontal ribs which can be circumferential or partially circumferential along the outer side of the side wall 6. In the embodiment shown in FIG. 10 there is provided one outer rib 15 having a cross-section of a half circle.

Figure 17:
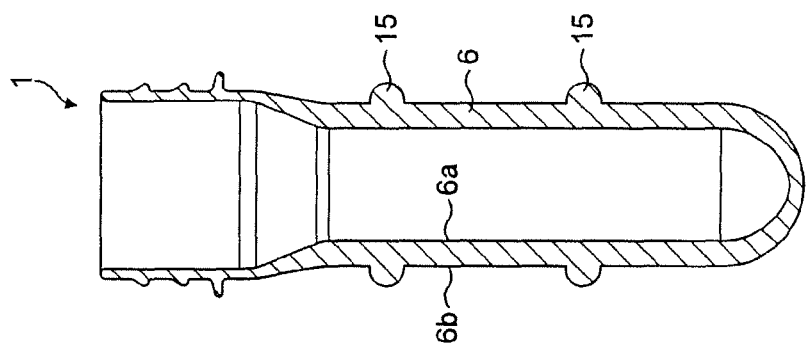
FIG. 17 shows a vertical cross-section of a sixth example of a preform.

FIG. 17 shows a cross-section of a sixth example of a preform 1. In this example also horizontal circumferential ribs are provided, whereby the ribs are two outer ribs 15 provided on the outside 6b of the side wall 6.

Figure 18:
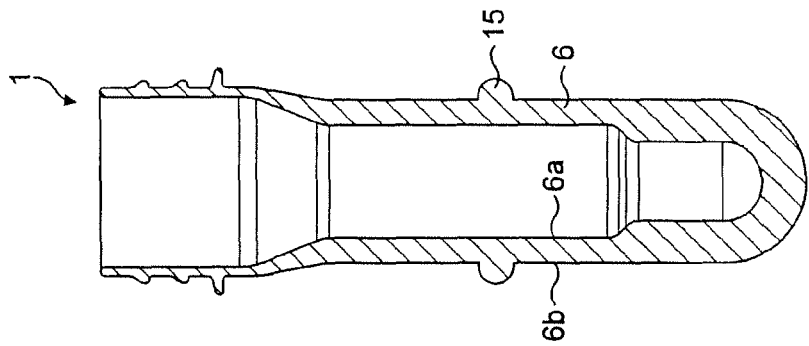
FIG. 18 shows a vertical cross-section of a seventh example of a preform.

FIG. 18 shows a cross-section of a seventh example of a preform 1. In this example outer a horizontal rib 15 is provided. In addition to the example as shown in FIG. 16, in this preform additionally a step 14 is provided. Such a step can be combined with any number and type of inner horizontal ribs and/or with any type of outer ribs.

According to an example, the side wall has an overall constant wall thickness. The ribs are only provided on several parts of the side wall 6, so that there are no steps within the side wall 6 of the preform.

Specifically, in the case of horizontal ribs as shown in FIGS. 16 and 17, there are provided no steps and the ribs are undercut, so that a constant wall thickness is achieved. However, the provision of steps is also possible, as shown in FIG. 18, where the outer ribs 18 are also undercut.

Figure 21:
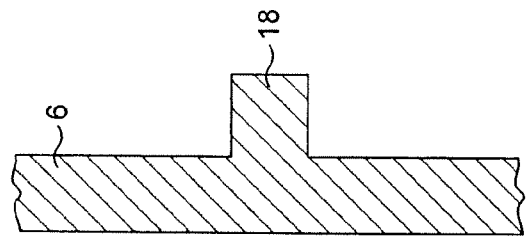
FIGS. 19 to 21 show different shapes of a horizontal rib within a preform.
Figure 20:
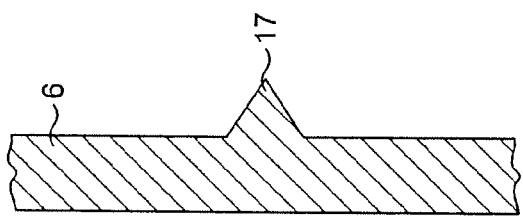
Figure 19:
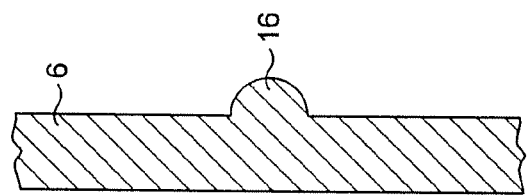

In FIGS. 19 to 21 different illustrations of possible shapes of inner horizontal or any type of vertical ribs are shown. Each of the FIGS. 19 to 21 hereby shows a cross-section of the side wall 6 of a preform according to an example in such a way, that the cross-section of the rib can be seen.

The ribs as shown in FIGS. 19 to 21 can be provided on the inside 6a or on the outside 6b or both of the side wall 6. As shown in FIG. 19 the rib 16 has a half-circular cross-section. More generally, as rib there can be provided a roundish rib 16.

As shown in FIG. 20 there can also be provided a triangular rib 17 having a triangular cross-section. The triangle can hereby be equilateral, equal-sided or have sides with different lengths. Further, the corners of the triangle can be rounded in a convex or concave shape.

As ribs also rectangular ribs 18 as shown in FIG. 21 can be provided. Also any other cross-section of ribs basing on an elliptical, trapezoidal or other cross-sections is possible.

The above described possible cross-sections of ribs apply to any kind of rib, i.e. horizontal, vertical, diagonal or any other direction.

Figure 22:
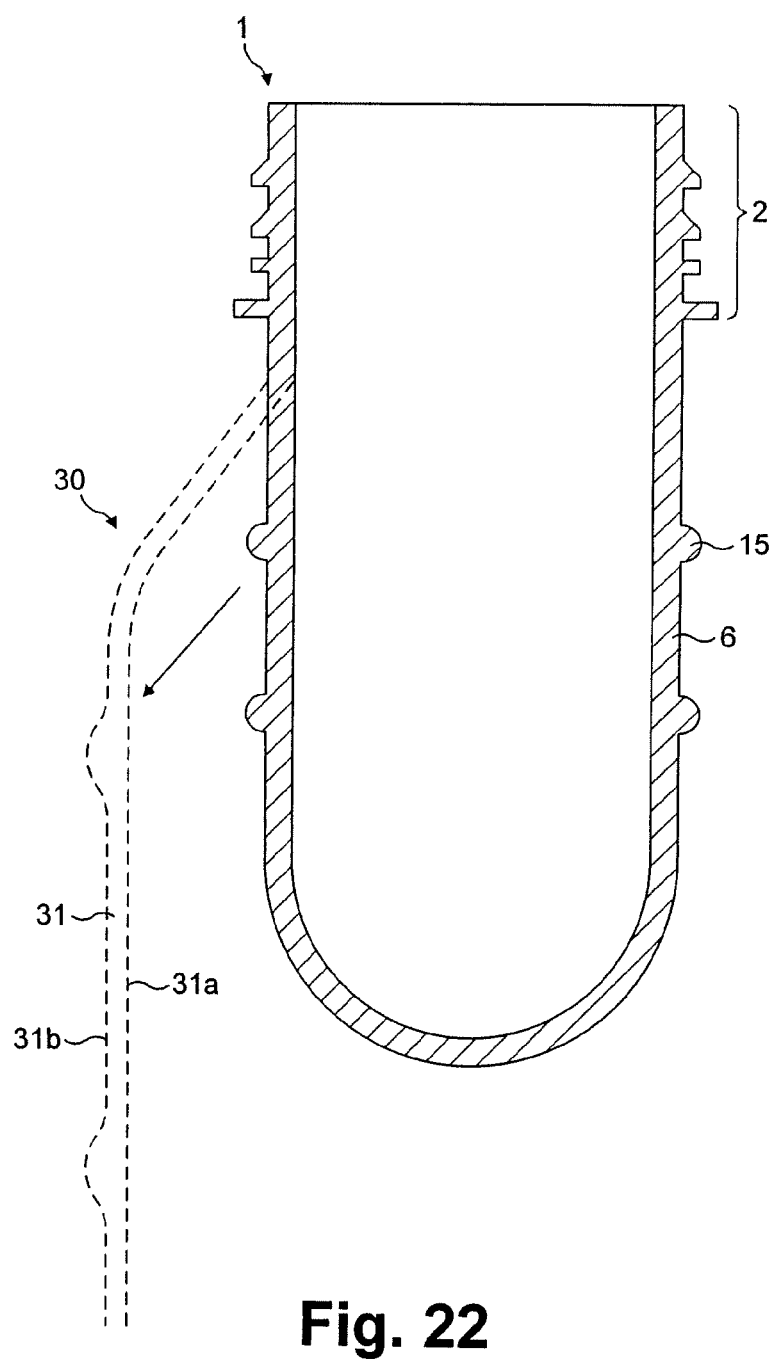
FIG. 22 shows a horizontal cross-section of a further example of a preform and schematically the form of the resulting blow-molded container.

FIG. 22 shows a cross-section of a preform having outer horizontal ribs 15 according an example. Also shown in FIG. 22 is a part 30 of a final container blow-molded from such a preform 1.

As can be seen the final container in this case comprises a side wall 31 having a substantially flat outer side 31b and an inner side 31a having smoothed outer ribs 34. By using ribs which are already provided within the preform instead of attaching ribs during the blow-molding process to the container, a very smooth and substantially continuous inner surface can be achieved.

The possibility of providing inner ribs 34 on the final container further is only possible when providing a preform with inner ribs 14. A preform and a corresponding container further has the advantage, that no protrusions will be present on the outer side, so that labeling applications are simplified. Labeling is improved since less problems with wrinkles or witness lines occur. This also makes the appearance of the final container more aesthetic.

In FIGS. 23A and 23B, different possibilities of positioning ribs according to the examples and embodiment of the present invention, respectively, are shown. In these figures schematically a preform 1 is shown and the neck portion 2 is also schematically indicated. As already explained, on the neck portion 2 no ribs or grooves are shown in the figures, however ribs and/or grooves can also be provided on the neck portion 2.

FIG. 23A shows an example with vertical ribs 40 extending along the complete vertical length of the side wall from the neck portion 2 to the bottom 7.

FIG. 23B shows an example with vertical ribs 41, which are extending partially along the vertical length of the side wall. The ribs 41 can extend along an upper part of the side wall 6 starting from the neck portion 2, can extend along a lower part of the side wall 6 starting from the bottom or can extend in a middle part of the side wall 6 and being spaced apart from the neck portion 2 as well as from the bottom 7.

The vertical ribs 40, 41 as shown in FIGS. 23A and 23B can be provided on the inner side of the wall 6 and/or on the outer side of the wall 6.

FIG. 23C shows an example with outer horizontal ribs 42 extending along the complete circumferential direction of the side wall 6.

FIG. 23D shows an example with outer horizontal ribs 43 extending only partially along the circumferential direction of the side wall 6. The same design as shown in FIGS. 23C and 23D can be applied to the embodiment of the present invention. That means the reinforcing elements 210 of the preform 200 shown in FIG. 1 can either extend along the complete circumferential direction of the side wall 206, or can extend only partially along the circumferential direction of the side wall 206.

Figure 24:
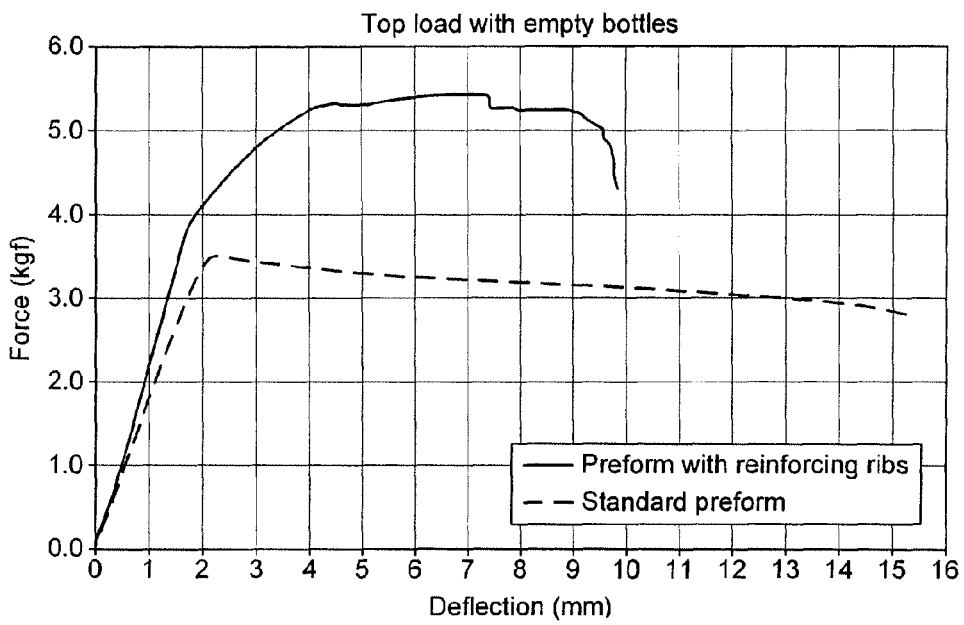
FIGS. 24 and 25 show the correlation between the top-load force and the deflection for a container blow-molded from a standard preform and an exemplary preform with ribs.
Figure 25:
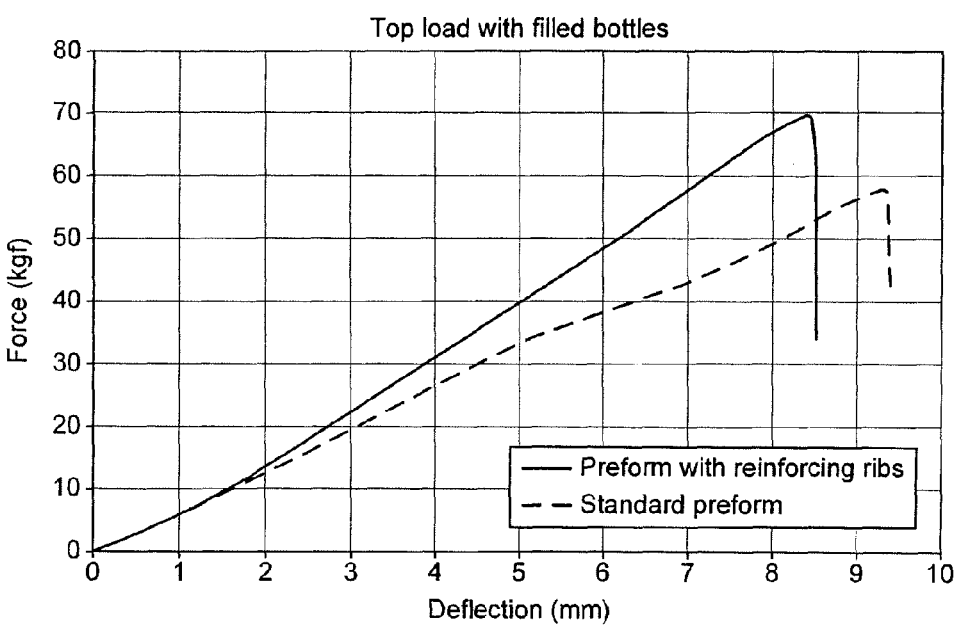

The advantages of the examples and embodiments will further become apparent from the diagrams in FIGS. 24 and 25. The diagrams on the Y-axis show the force in kgf, which was exerted on the top of a bottle which was produced from a preform having vertical ribs. On the X-axis the deflection of the bottle in mm is shown.

Hereby, FIGS. 24 and 25 shows the comparison between a bottle produced from a preform with reinforcing ribs and a bottle produced from a standard preform of the same material weight. The graph shown with dashed lines is the one resulting from the standard preform. The diagram in FIG. 24 hereby shows the case of measuring the top load with empty bottles and FIG. 25 shows the case of measuring the top load with filled bottles.

As can be seen from both diagrams the bottles produced from the preforms with reinforcing ribs according to the examples and embodiments are able to withstand higher forces before deflection occurs. On the other hand, due to the reinforcing ribs the rest of the wall of the bottle can be made thinner, so that the bottle as a whole can have less weight and needed material.

Figure 26:
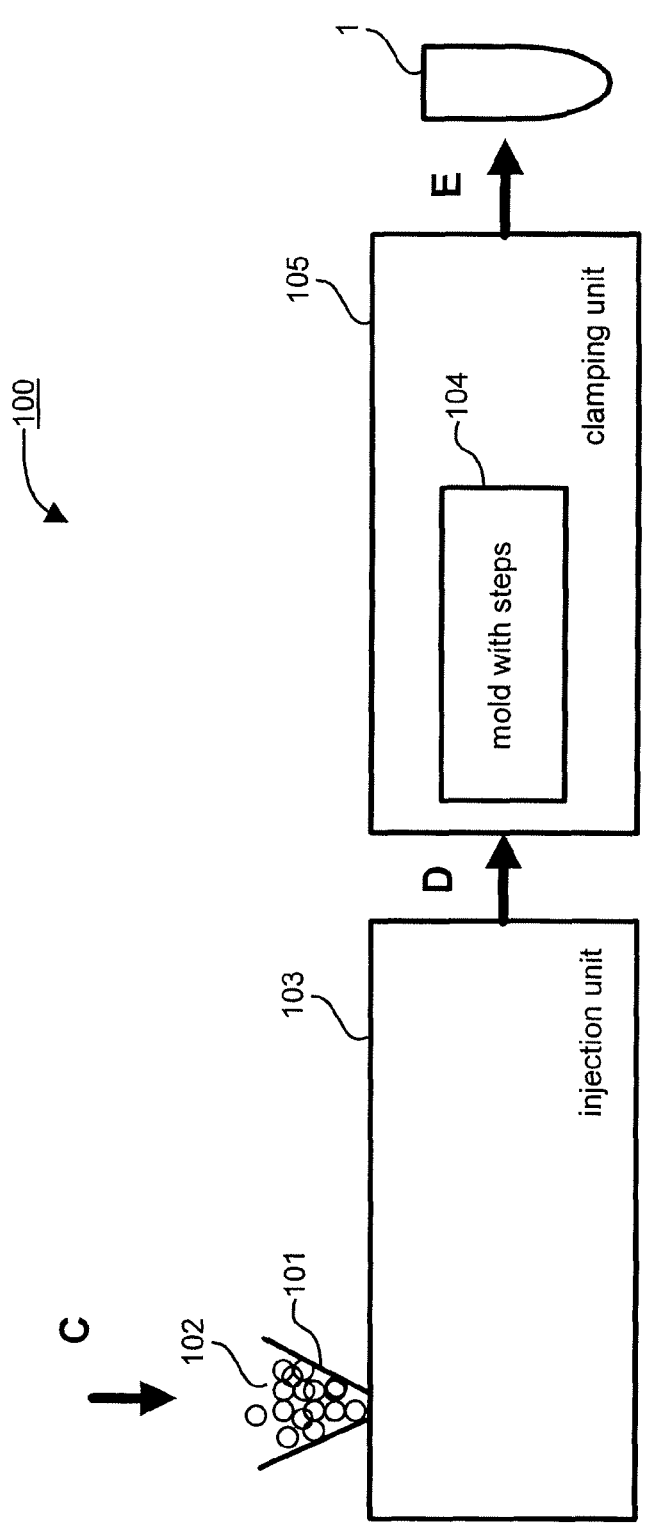
FIG. 26 schematically shows a block diagram of a injection-molding machine.

A device for injection molding is schematically shown in FIG. 26.

An injection-molding machine 100 comprises generally an injection unit 103 and a clamping unit 105. The injection unit 103 usually includes a hopper 101 into which the molding material 102 is filled as indicated with arrow C. The injection unit 103 is only schematically shown in FIG. 26 since it comprises all units usually comprised within an injection unit depending on the type of injection-molding machine used, for example an injection ram, a screw, a barrel, a heater or the like. The injection unit 103 melts the material provides the material to the clamping unit 105, as schematically indicated with arrow D.

The clamping unit 105 comprises a specific mold 104 preferably with steps, as for example illustrated in FIG. 3, which allows to provide a preform 200 with reinforcing elements 210 according to the present invention. Also the clamping unit 105 comprises all necessary features which are usually comprised within a clamping unit. The specific feature is that the mold 104 is adapted to produce performs 200, which further produces, in a blow-molding process, containers 300 with reinforcing elements 320 on their inside surface. Thus, containers 300 with a smooth outer surface, e.g. a bottle with a smooth outside panel, can be obtained providing advantages for labeling application. From the clamping unit then the preform 200 according to the present invention is output, as schematically indicated with arrow E.

Figure 27:
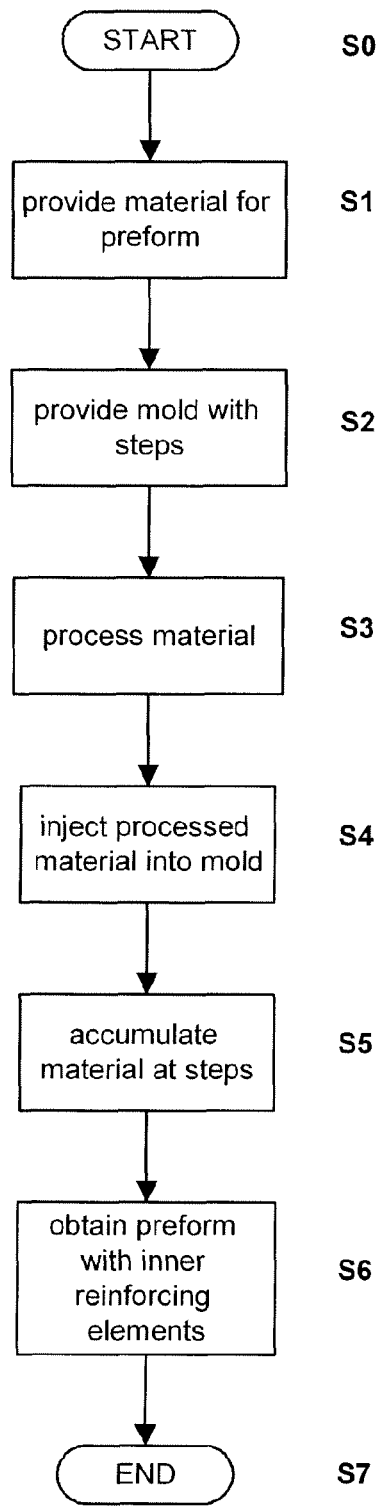
FIG. 27 is a flow chart showing the process steps for producing a preform according to the present invention and FIG. 28 is a flow chart showing the process steps for producing a container according to the present invention.

Now the general steps for producing a preform 200 will be shown with reference to the flow chart in FIG. 27.

The process starts in step S0. In step S1 the material for the preform 200 is provided.

The material for the preform hereby is a plastic, preferably a thermoplastic. The thermoplastic is chosen from the group consisting of polyethylene terephthalates, polypropylenes, polyethylenes, polycarbonates, polystyrenes, polylactic acids, polyvinyl chlorides and combinations thereof. In the preferred embodiment, it is PET.

In step S2 the mold, preferably with the steps, is provided. In step S3 the material is processed for example by the injection unit 103. In step S4 the processed material is injected into the mold 104. After operation of the clamping unit 105, material is accumulated, preferably at the steps 208, in the mold in step S5, in order to obtain in step S6 the preform 200 provided with reinforcing elements 210. The process ends in step S7.

Figure 28:
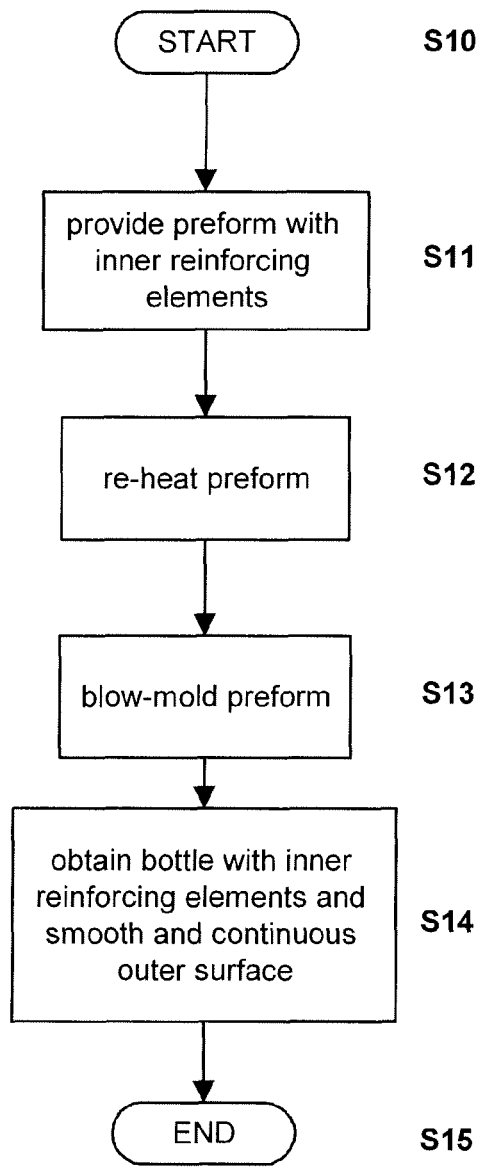

Now the process of blow-molding a container from a preform 200 is schematically explained with reference to FIG. 28. The process starts in step S10. In step S11 the inventive preform 200 with reinforcing elements 210 is provided and reheated in step S12. In the next step S13 the preform 200 is inserted into the blow-mold and the preform 200 is blow-molded, thereby obtaining in step S14 the final container 300, preferably a bottle, having reinforcing elements 210 and having a smooth and continuous outer surface. The process ends in step S15.

It should be understood that various changes and modifications to the presently preferred embodiment described herein will be apparent to those skilled in the art. Such changes and modifications can be made without departing from the scope of the present invention and without diminishing its attendant advantages. It is therefore intended that such changes and modifications be covered by the appended claims.

What is claimed is:

1. A preform for a container, the preform comprising:
at least three reinforcing elements, each having a substantially triangular cross-section and provided on an inner side of a side wall of the preform extending each at a step in a direction perpendicular to a longitudinal axis of the preform and equidistant to each adjacent reinforcing element, wherein at each step, the inner side of the side wall is bent inward at an angle of about 90° relative to a longitudinal axis of the preform while a diameter of an outer side of the side wall decreases gradually, and the at least three reinforcing elements each have a thickness which is 7% to 50% greater than a thickness of the side wall of the preform.

2. The preform of claim 1, wherein the at least three reinforcing elements each extend in a circumferential direction of the preform on the inner side of the side wall of the preform.

3. The preform of claim 1, wherein the at least three reinforcing elements each are formed by an accumulation of material on the inner side of the side wall of the preform.

4. The preform of claim 1, wherein the at least three reinforcing elements each are formed by the step of the side wall of the preform.

5. The preform of claim 1, wherein a bottom reinforcing element is located at a first distance from a tip of the preform, and a top reinforcing element is located at a second distance from the tip of the preform, and the ratio of a height of the preform to the first distance is 4.48 to 13.46, and the ratio of the height of the preform to the second distance is 1.34 to 1.93.

6. The preform of claim 1 being made from a thermoplastic material selected from the group consisting of polyethylene terephthalates, polypropylenes, polyethylenes, polycarbonates, polystyrenes, polylactic acids, polyvinyl chlorides and combinations thereof.

7. The preform of claim 1, wherein the thickness of each of the at least three reinforcing elements is 22% to 30% greater than the thickness of the side wall of the preform.

8. The preform of claim 1, wherein at each step, the outer side of the side wall is slanted inward at an angle of 25° to 55° relative to the longitudinal axis of the preform.

9. A preform for a container, the preform comprising:
three reinforcing elements, each having a substantially triangular cross-section and provided on an inner side of a side wall of the preform, the reinforcing elements each extend at a step in a direction perpendicular to a longitudinal axis of the preform and are equidistant to each adjacent reinforcing element, wherein at each step, the inner side of the side wall is bent inward at an angle of about 90° relative to a longitudinal axis of the preform, and wherein the reinforcing elements comprise a bottom reinforcing element located at a first distance from a tip of the preform, a top reinforcing element located at a second distance from the tip of the preform, and a middle reinforcing element located between the bottom and the top reinforcing element at a third distance from the tip of the preform, the ratio of the height of the preform to the third distance is 2.24 to 3.37, the ratio of the height of the preform to the first distance is 4.48 to 13.46, the ratio of the height of the preform to the second distance is 1.34 to 1.93, and the three reinforcing elements each have a thickness which is 7% to 50% greater than a thickness of the side wall of the preform.

10. The preform of claim 9, wherein the reinforcing elements each are at a step a diameter of the inner side of the side wall decreases abruptly while a diameter of an outer side of the side wall decreases gradually.

* * * * *